United States Patent [19]

Tse

[11] Patent Number: 4,949,030
[45] Date of Patent: Aug. 14, 1990

[54] ISOLATED ANALOG VOLTAGE SENSE CIRCUIT

[75] Inventor: Man S. Tse, Kowloon, Hong Kong

[73] Assignee: Astec International Limited, Kowloon, Hong Kong

[21] Appl. No.: 81,840

[22] Filed: Aug. 5, 1987

[51] Int. Cl.⁵ .................. G01R 19/18; H03K 5/00; H03F 3/38
[52] U.S. Cl. .................. 324/127; 307/571; 324/118; 330/10
[58] Field of Search .................. 324/127, 118, 119; 330/10; 363/56; 307/240, 246, 571

[56] References Cited

U.S. PATENT DOCUMENTS

| | | | |
|---|---|---|---|
| 2,137,846 | 11/1938 | Klutke | 324/119 |
| 2,198,226 | 4/1940 | Peterson | 324/119 |
| 3,156,859 | 11/1964 | Cox | 324/118 |
| 3,430,125 | 2/1969 | Povenmire et al. | 324/118 |
| 3,581,184 | 5/1971 | Hurd, III | 324/118 |
| 3,631,329 | 12/1971 | Kimball | 324/118 |
| 3,914,689 | 10/1975 | Wright | 324/119 |
| 3,931,582 | 1/1976 | Kato et al. | |
| 3,962,631 | 6/1976 | Poppinger | 324/119 |
| 4,030,041 | 6/1977 | Sasaki | |
| 4,068,135 | 1/1978 | Sonobe et al. | |
| 4,295,188 | 10/1981 | Brunssen | |
| 4,360,784 | 11/1982 | Bartlett | |
| 4,395,647 | 7/1983 | Morong, III | |
| 4,511,815 | 4/1985 | Wood | |
| 4,513,245 | 4/1985 | Yokoyama | 324/119 |

Primary Examiner—Ernest F. Karlsen
Attorney, Agent, or Firm—McCubbrey, Bartels, Meyer & Ward

[57] ABSTRACT

An improved isolated analog sense circuit comprises a sensor for passively sensing voltages, a transformer, a capacitor, a clock signal generator, a switch, and a diode. The transformer has two windings, the first of which is coupled to the sensor with the transformer coupling the voltage to be sensed from the first winding to the second winding. The switch is coupled between the capacitor and the second winding, and is responsive to the clock signal generated by the clock signal generator. Operation of the switch causes the capacitor to charge up to a voltage representative of the sensed voltage. The diode is included in the sensor to prevent current flow in the first winding of the transformer when the switch is off.

14 Claims, 5 Drawing Sheets

ISOLATED ANALOG VOLTAGE SENSE CIRCUIT

FIELD OF THE INVENTION

This invention relates to the field of isolated sensor circuits and more particularly to an isolated voltage sensing circuit which is adapted for use with switching power supplies.

BACKGROUND OF THE INVENTION

Switching power supplies are well known for their excellent performance over a wide range of load conditions and operating temperatures. Examples of switching power supplies include forward converter and flyback designs. Switching power supplies are typically used to convert a first DC voltage, e.g., a high input voltage, into a second DC voltage, e.g. a voltage which is relatively low. Since these power supplies typically use transformers for energy conversion, they are used in applications which require input/output isolation. An example of a switching power supply having input/output isolation is disclosed in U.S. Pat. No. 4,323,961 issued to Elliot Josephson.

As with any type of regulated power supply, an isolated power supply requires some means for sensing its output voltage to complete the regulator loop. To preserve input/output isolation, it is essential that the sensed output voltage is also fed back via an isolator circuit. Typical isolators include opto-isolators or feedback isolation transformers. In situations where a high degree of isolation is required, most prior art sensors have been quite complex and expensive.

One type of isolated sensor is described in U.S. Pat. No. 4,030,041, by Sasaki. In this device, a signal derived from the primary winding of a transformer is used to switch an optical isolator. The output of the optical isolator is used to control a FET switching device which is coupled between one secondary winding of the transformer and a buffer amplifier. A capacitor is also coupled to the input of the buffer amplifier. The Sasaki invention relies on a transformer having a primary and four secondary windings and an optical isolator to unite the operation of the device. This device has several disadvantages. For example, since the isolation transformer is embedded into the line power transformer, the bandwidth of the device is limited. Since the operation of the device is synchronized to a supplied line frequency, its operation is also relatively slow. Furthermore, switching devices which rely on optical isolators to provide isolation between primary and secondary control signals typically exhibit poor stability over time and temperature.

A somewhat simpler device is disclosed in U.S. Pat. No. 3,931,582, issued to Kato, et al. In this device, a DC amplifier supplies power to a first series coupled diode and condenser through an electronic switch which is driven by a pulse generator. This diode and condenser combination is coupled across the primary winding of a transformer. An identical second diode and condenser combination is coupled across the secondary winding of the transformer. Feedback is provided to the DC amplifier through a resistor which is coupled between the inverting input of the DC amplifier and the common terminal of said first diode and condensor combination. In this device, the active circuitry is located on the primary side of the transformer and is therefore subject to damage from any high voltage which may appear thereon. Since a DC amplifier is used to drive the primary of the transformer, the device is also subject to variations in linearity over a range of temperatures. Furthermore, this circuit is more complex than is desirable because it requires identical diode and condenser combinations on both sides of the transformer to generate an isolated voltage. Any variation in the matching between these identical circuits will affect the accuracy of the device. While this device discloses a single transformer structure, it is disadvantageous because it does not provide a controlled discharge path for the capacitor and it cannot respond to signals with fast fall times. Furthermore, the capacitor voltage cannot be held constant due to leakage through a resistor.

Other types of sensors employ devices known as choppers or synchro-rectifiers which synchronize the operation of the sensor circuitry. In this class of device, two transformers are required; one for the sensed analog signal and one for the synchronization signal. Still other chopper or synchro-rectifiers employ a single transformer having multiple secondary windings therein to operate the switching device. An example of an isolated sensor of this type is shown in U.S. Pat. No. 4,506,230 by Ashley-Rollman and in U.S. Pat. No. 4,286,225 by Morong. In each of these references, a complicated transformer structure is required. As a result, the capacitive coupling between each side of the circuit is relatively high. Furthermore, each of these references requires active components on the input side of the circuit thus requiring a relatively stable isolated power supply.

While the above discussion discloses the use of isolated sensors in switching power supplies, isolated sensors are also used in a variety of other applications. For example, isolated sensors are often used in data acquisition applications to protect computer data input lines from spurious DC signals appearing thereon. Isolated sensors are also widely used in medical applications where it is critical to protect a patient from any high voltage which may be generated by medical testing equipment.

One type of isolated sensor that is often used in medical instrumentation devices is the instrumentation grade isolation amplifier. One example of an instrumentation grade isolation amplifier is shown in U.S. Pat. No. 3,946,324 by Smith. Instrumentation grade isolation amplifiers are necessarily quite complex and as such they are among the most expensive of all isolation devices. The expense of devices of this type prohibits their use in power supply applications.

From the foregoing, it can be seen that no device is known which provides a high degree of isolation at low cost, without requiring an optical isolator, a synchronizing signal or a complicated transformer structure to construct the isolated sensor.

Accordingly, it is an object of the present invention to provide an improved isolated sensor having a minimum number of components.

It is another object of the present invention to provide an improved isolated sensor which uses a transformer having a single primary and secondary winding.

It is still another object of the present invention to provide an isolated sensor which does not require synchronization between the circuitry on either side of the transformer.

It is yet another object of the present invention to provide an isolated sensor with improved bandwidth and stability over temperature and time.

These and other objects of the invention will become apparent to those skilled in the art from the following description, taken in connection with the accompanying drawings wherein:

SUMMARY OF THE INVENTION

Briefly described, the isolated sensor of the present invention includes a transformer having a single set of windings. The active circuitry is located entirely on the sensor output side of the transformer opposite the voltage to be sensed. The active circuitry comprises a switching device coupled in series between the output of the sensor and one side of the output winding of the transformer. The switching device and a current source periodically function to control the amount of charge on a capacitor coupled across the output of the device as a function of the sensed input voltage. The charge developed across the capacitor will be at substantially the same voltage as the voltage coupled to the input winding of the transformer, the transformer functioning to provide isolation between the input voltage and the sensor output. The capacitor substantially retains this voltage during the time that the switching device is off.

DETAILED DESCRIPTION OF THE INVENTION

Figure 1A:
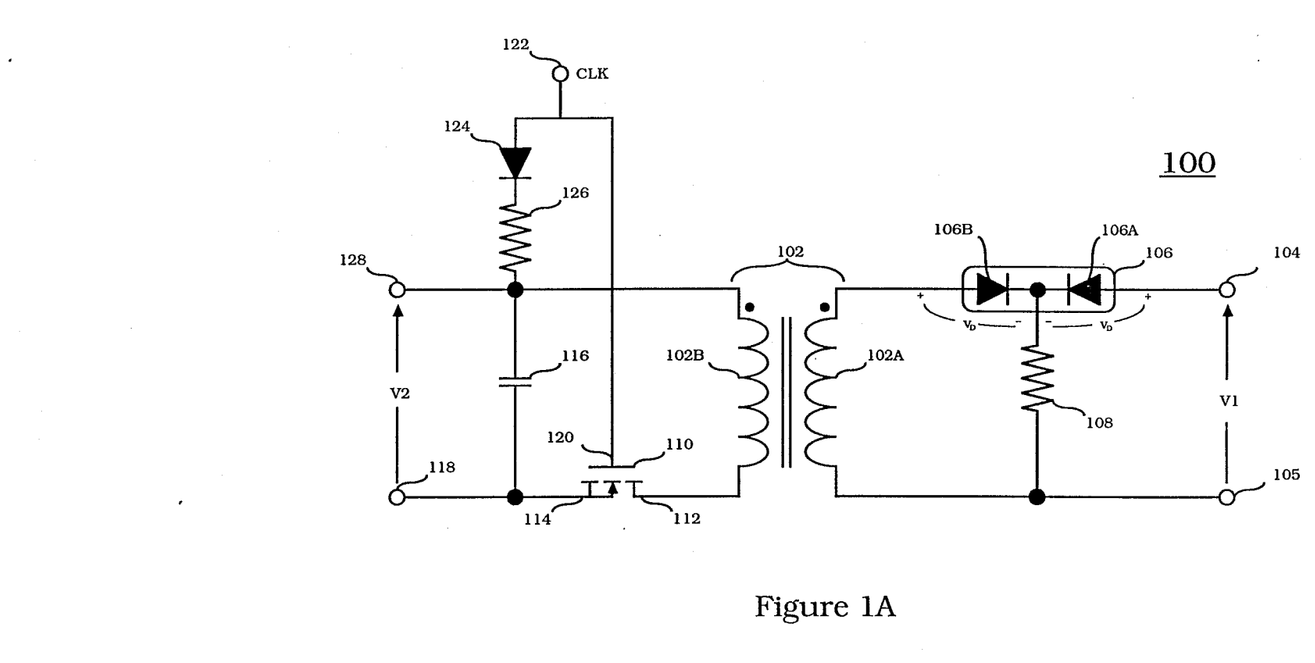
Figure 1A is a schematic diagram of a first embodiment of the invention.

Referring now more particularly to FIG. 1A, an exemplary embodiment 100 of an isolated analog voltage sense circuit is shown for sensing a voltage V1 appearing at input terminals 104, 105. A 1:1 transformer 102, including first and second windings 102A and 102B, is used to couple the input to the output of the device. One terminal of winding 102A of transformer 102 is coupled to input terminal 104 through twin diodes 106. Twin diodes 106 include diodes 106A and 106B whose cathodes are connected in common. The anode of twin diode 106A is coupled to the input terminal 104 and the anode of twin diode 106B is coupled to one terminal of winding 102A. The other terminal of winding 102A is coupled directly to terminal 105. A resistor 108 is coupled between the common cathode of the twin diodes 106 and terminal 105.

All of the active circuitry of the isolated sensor 100 is located on the sensor output side of the transformer 102. The primary active element is switching device 110 which preferably comprises a FET transistor. The drain terminal 112 of switching device 110 is coupled to one terminal of winding 102B. The source terminal 114 of switching device 110 is coupled to one side of a capacitor 116 and to an output terminal 118. The gate terminal 120 of switching device 110 is coupled to a clock signal input terminal 122. An appropriate clock signal, derived from a conventional clock generator (not shown), is coupled to input terminal 122.

A diode 124 and resistor 126 are connected in series between terminal 122 and the side of capacitor 116 opposite to the side connected to terminal 118. This side of capacitor 116 is also coupled to output terminal 128 and to the other terminal of winding 102B.

In operation, a voltage is developed across resistor 108 which is equal to the sensed voltage V1 less a voltage drop $V_D$ across diode 106A. On the positive cycle of the clock signal (CLK) appearing at terminal 122, switching device 110 is turned 'on' and capacitor 116 is provided with a charging current by diode 124 and resistor 126. Capacitor 116 continues to charge until the voltage V2 across capacitor 116 reaches the sum of the voltage across resistor 108 and twin diode 106B. At this point, further charging current from resistor 126 is diverted to ground through the 1:1 transformer 102. If the value of voltage V1 later changes such that the voltage across capacitor 116 now exceeds V1, during the next positive cycle of CLK capacitor 116 will discharge through the same path a sufficient amount such that V2 equals the new value of V1.

On the negative cycle of CLK, switching device 110 is turned 'off' and diode 124 blocks the flow of any current in a reverse direction through resistor 126. At this point, the charge present on capacitor 116 will be substantially equal to V1. This charge will remain on capacitor 116 until the next positive occurrence of CLK independent of any change in V1 during this CLK low cycle. While switching device 110 is off, capacitor 116 is isolated from transformer 102, enabling transformer 102 to reset.

According to the teachings of the present invention, twin diodes 106 are used to cancel any voltage offset error which would be introduced by a single diode. The specific diodes used to implement the twin diodes 106 are not critical to this invention but a BAS 16 may be advantageously employed. Diode 124 may be a BAV 70. Both of these diodes are available from U.S. Philips. Resistor 108 may be approximately 100 ohms, and resistor 126 may be approximately 330 ohms. Capacitor 116 may be approximately 0.01 microfarads. The switching device 110 may be an n-channel MOSFET, such as a 2N7002, although a variety of other switching devices could be substituted therefor.

The clock signal coupled to terminal 122 may be generated by a wide variety of circuits, and the actual switching speed will vary from application to application. However, the frequency and duty cycle of the clock signal may limit the bandwidth and slew rate of isolated sensor 100. One example of a suitable clock signal is a square wave signal having a 5.6 V peak voltage with a 15% duty cycle and a 500 KHz operating frequency. Voltages in the range of 2.5 V ±0.5 V may be detected with the circuit 100 using this clock signal.

Figure 1B:
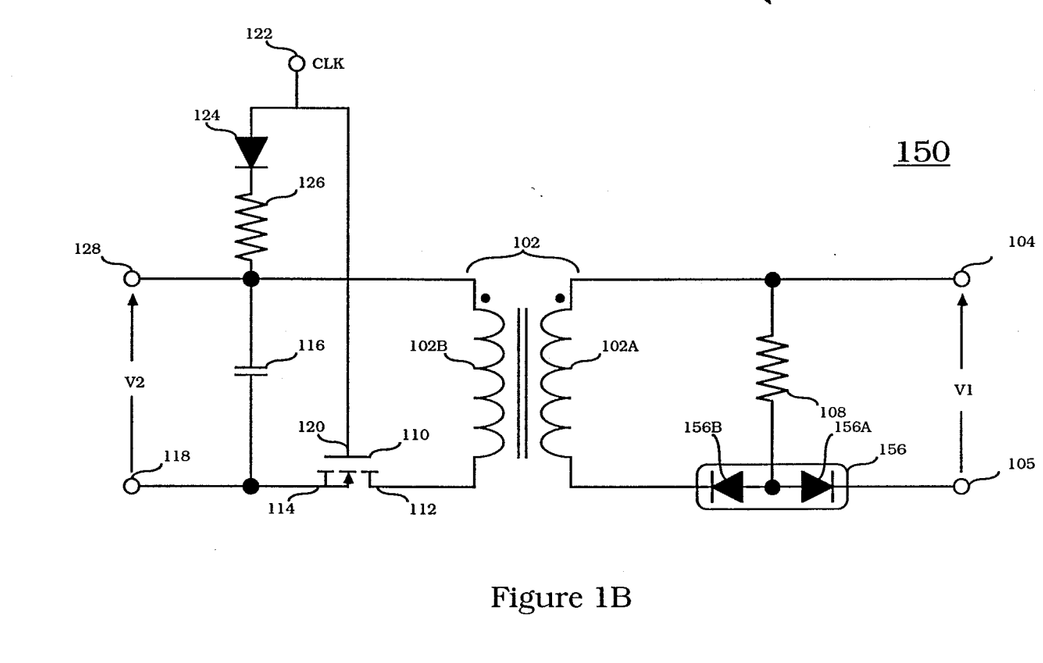
Figure 1B is a schematic diagram of a second embodiment of the present invention.

FIG. 1B is a schematic diagram depicting a second embodiment 150 of the present invention. The circuit 150 is a modification of the circuit 100 of FIG. 1A wherein the twin diode 106 is replaced by twin diode 156. Twin diode 106 is configured such that diodes 106A and 106B are coupled with a common cathode connection. This allows twin diode 106 to be placed on the positive input side of the circuit. The teachings of the present invention provide that a common anode diode 156 may be substituted for twin diode 106 if it is placed on the negative input side of the circuit as shown in FIG. 1B. Therefore, the cathode of diode 156A is coupled directly to terminal 105. The cathode of diode 156B is coupled to one terminal of winding 102A and the other terminal of winding 102A is coupled directed to terminal 104. A resistor 108 is disposed between terminal 104 and the common anode connection of twin diode 156.

Figure 2A:
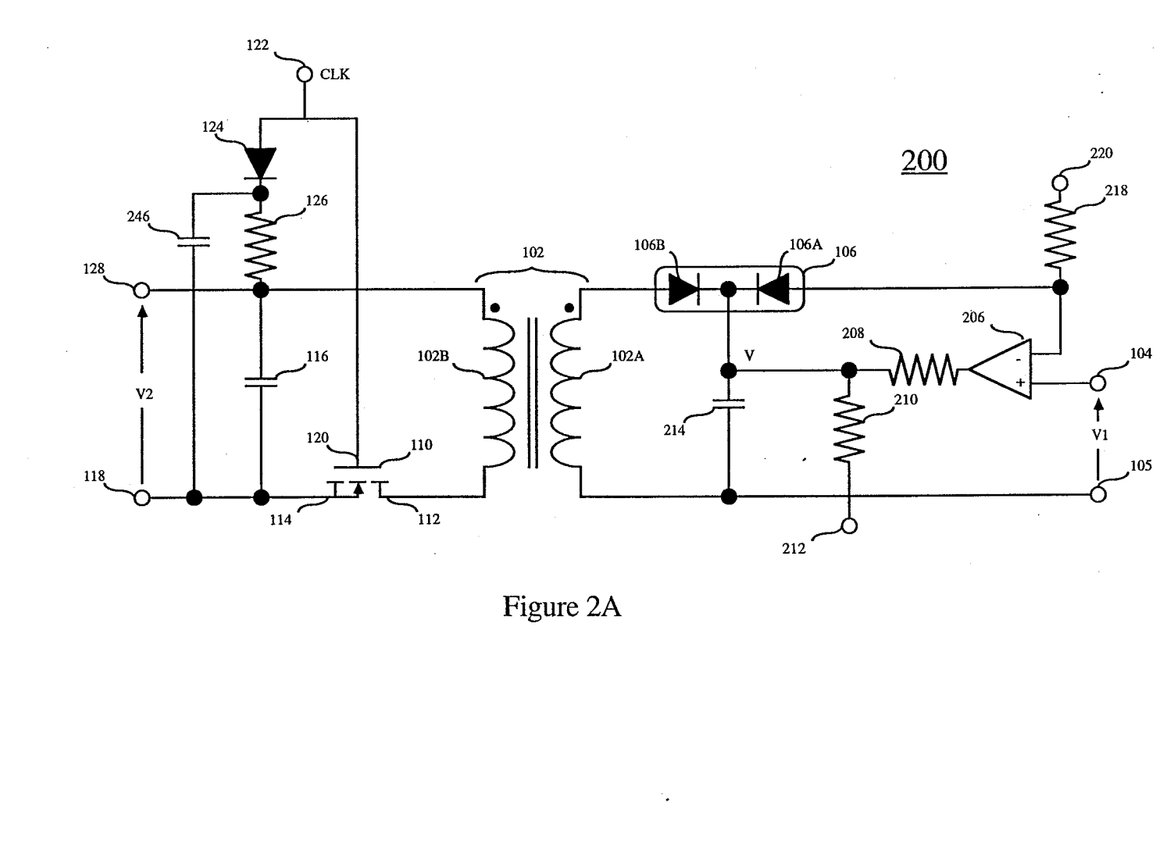
FIG. 2A is a schematic diagram of the preferred embodiment of the invention.

Referring now to FIG. 2A, there is shown a preferred embodiment 200 of an isolated analog voltage sense circuit according to the present invention. The circuit 200 employs the same basic configuration as the circuit 100 but incorporates additional components which improve the operation and stability of the circuit. In the description of this embodiment of the present invention, similar elements bear the same numbers as the elements in FIG. 1A. Only the new elements are discussed in detail herein.

The preferred embodiment 200 includes input terminals 104 and 105, which are coupled to the voltage V1 to be sensed. Terminal 104 is coupled to the non-inverting input of an amplifier 206 which presents a high impedance at terminal 104. The output of amplifier 206 is coupled to a resistor network comprising resistors 208 and 210. Resistor 208 cooperates with capacitor 214 to stabilize amplifier 206. Resistor 210 pre-loads the output stage of amplifier 206 to improve its current sinking capability. One end of resistor 210 is coupled to a negative power supply $-V$ at terminal 212. The common junction of resistors 208 and 210 is coupled to one side of capacitor 214 and to the common cathode connection of twin diode 106. The anode of twin diode 106A is coupled to a pullup resistor 218 and the inverting input of amplifier 206. The opposite end of resistor 218 is coupled to a voltage source $+V$ at terminal 220 to provide a biasing current for diode 106A. Without this biasing current, a 0.6V drop across diode 106A cannot be maintained with this circuit configuration. The anode of twin diode 106B is coupled to one side of winding 102A of transformer 102. The other side of winding 102A is coupled to terminal 105 and the other side of capacitor 214.

Amplifier 206 stabilizes the voltage across capacitor 214 to a voltage which is equal to the input voltage V1 minus the diode drop caused by diode 106A in its feedback loop. Therefore, the maximum voltage developed across winding 102A and hence 102B of transformer 102 will be equivalent to the input voltage V1.

The preferred embodiment 200 also employs a 1:1 transformer 102 to couple the input voltage V1 to the output of the sensor device. A FET switching device 110 is coupled in series between one side of winding 102B of transformer 102 and terminal 118 which is one output terminal of the device. The other output terminal 128 of isolated sensor 200 is coupled the other side of winding 102B of transformer 102. The FET 110 is switched 'on' by a clock signal (CLK) appearing at terminal 122 which is coupled to the gate of FET 110. The clock signal described herein may have the same characteristics as the clock signal described in conjunction with FIG. 1A. A capacitor 116 is connected between terminals 118 and 128. When CLK is high, FET 110 turns 'on' and capacitor 116 is charged by CLK through a series connected diode 124 and resistor 126. Accordingly, a voltage is developed across capacitor 116 and thus across output terminals 118 and 128 which is substantially equal to the input voltage V1.

The circuit 200 provides another improvement over the circuit 100 by including a capacitor 246 which is coupled between the cathode of diode 124 and the terminal 118. During the falling edge of CLK, the inherent capacitance of FET 110 together with the parasitic capacitance across winding 102B cause capacitor 116 to discharge slightly. The addition of capacitor 246 prevents capacitor 116 from discharging by applying a charging voltage to capacitor 116 for a brief period during the negative transition of CLK. More specifically, the voltage VC246 will rise to the peak voltage of CLK less one diode drop caused by diode 124 once CLK is high, and will discharge to $V_{C116}$ via R126 for a brief period during the falling edge of CLK. This compensates for the parasitic effects caused by switching speed of FET 110 and interwinding capacitance of transformer 102.

The voltage $V_{C116}$ and thus V2 may further drop slightly because of the discharging of capacitor 116 as a function of the impedance of the circuit coupled to the output of the sensor device. In such a case the voltage drop across capacitor 116 will be off only a fraction of a percent from its nominal operating voltage. Typically, the voltage drop $V_{C116}$ due to loading may be in the range of 0.2 mV over the 2.5 V input voltage.

Figure 2B:
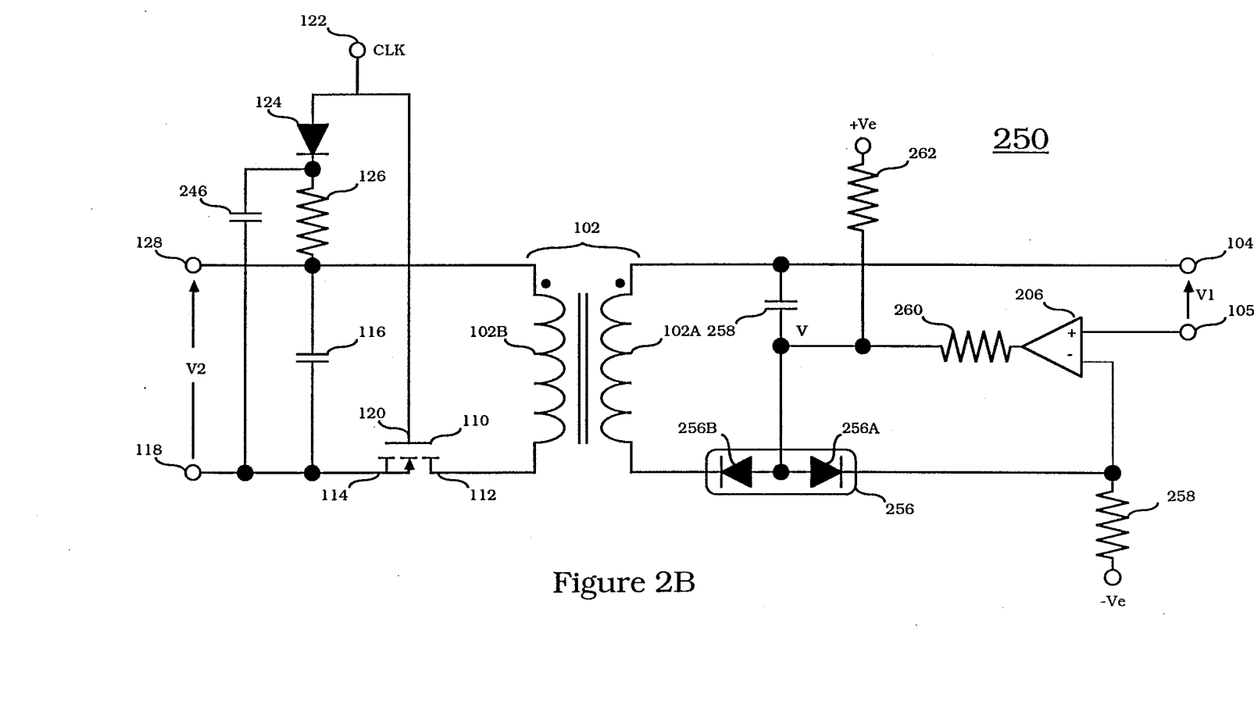
FIG. 2B is a schematic diagram of a fourth embodiment of the invention.

FIG. 2B is a schematic diagram depicting a fourth embodiment 250 of the present invention. The circuit of 250 is a modification of the circuit 200 of FIG. 2A wherein a common anode twin diode 256 is substituted for the common cathode twin diode 106. Since this embodiment employs a twin diode which is coupled to the negative side of the circuit, a resistor 258 is coupled between the negative power supply input terminal $-V_e$ and the common connection of the cathode of diode 256A and the inverting input of amplifier 206. In the circuit 250, capacitor 214 is replaced by capacitor 258 which is coupled between the positive input terminal and the common anode terminal of twin diode 265. A resistor 260 is coupled between the output terminal of amplifier 206 and the common connection of twin diode 256 and capacitor 258. This common connection is further coupled to resistor 262. The other terminal of resistor 262 is coupled to the positive power supply input terminal $+V_e$. Those skilled in the art will appreciate that the operation of the circuits 200 and 250 is substantially the same with the exception of the voltages which appear across the twin diodes 106 and 256 respectively and the direction of the currents associated therewith.

Figure 3:
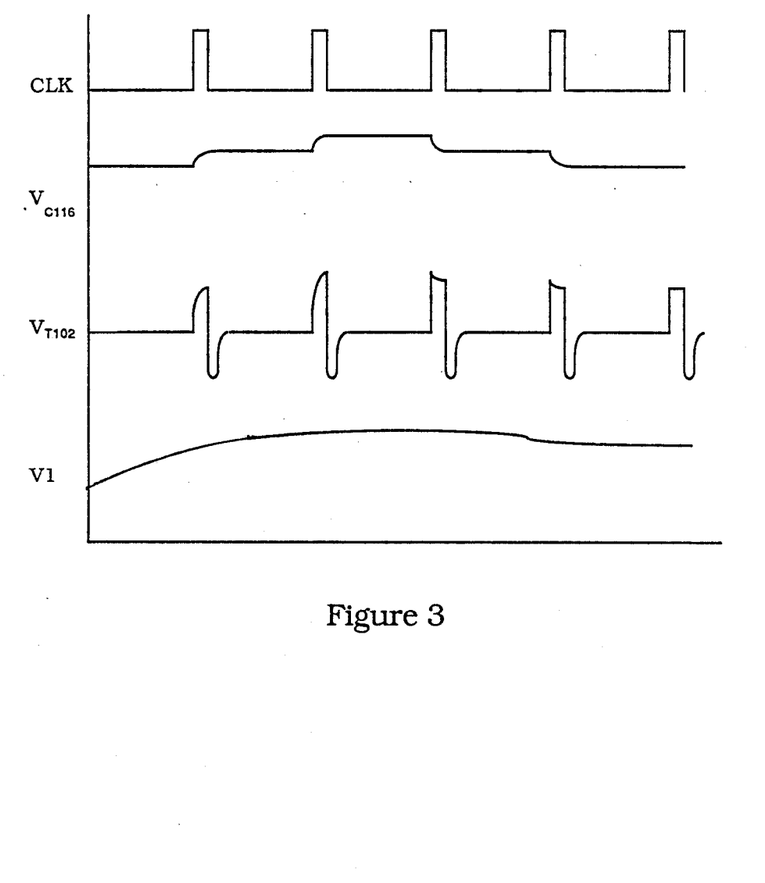
FIG. 3 illustrates various operating waveforms of the circuit of FIG. 2A.

FIG. 3 is a series of graphs which depict the various operating waveforms of the present invention. Prior to the point where the input voltage V1 is present, the voltage present on capacitor 116 ($V_{C116}$) will be approximately zero volts. When a voltage V1 is applied to the input terminals, the voltage $V_{T102}$ across the windings of transformer 102 will rise to a voltage equal to V1. Responsive to this voltage, capacitor 116 will begin to charge upon the positive occurrence of CLK. If V1 is then reduced to a lower value, the voltage VT102 will be clamped to a voltage no higher than V1. Capacitor 116 will be discharged to V1 upon the occurrence of a positive cycle of CLK.

In summary, an improved isolated sensor circuit is described. The present isolated sensor employs a single switching device to charge a capacitor on the sensor output side of a transformer. The switching device may be controlled by an external clock signal and does not require any type of synchronization. The present invention achieves improved performance without requiring a complex transformer structure or multiple switching devices. While the present invention has been described in the context of a preferred exemplary embodiment, other uses and modification will be apparent to a person of ordinary skill without departing from the spirit and scope of the invention. Such uses and modifications are intended to fall within the scope of the appended claims.

What is claimed is:

1. An improved analog sense circuit comprising:
   (a) sensing means for passively sensing an input voltage;
   (b) transformer means having first and second windings wherein each of said first and second windings have first and second terminals and further wherein said first and second terminals of said first winding are coupled to said sensing means, said transformer means for coupling said sensed input voltage from said first winding to said second winding of said transformer means;
   (c) clock signal input means for coupling a clock signal to said improved analog sense circuit;
   (d) capacitor means coupled to the first terminal of said second winding of said transformer means; and
   (e) switching means coupled between said capacitor means and said second terminal of said second winding of said transformer means, said switching means responsive to said clock signal for causing said capacitor means to charge up to a voltage representative of said sensed input voltage upon the occurrence of said clock signal, including means for generating a conductive path between said capacitor and said second terminal of said second winding of said transformer upon the occurrence of said clock signal, said sensing means including diode means for preventing current flow in said primary winding of said transformer when said switching means is non-conductive.

2. An improved analog sense circuit comprising:
   (a) sensing means for passively sensing an input voltage;
   (b) transformer means having first and second windings wherein each of said first and second windings have first and second terminals and further wherein said first and second terminals of said first winding are coupled to said sensing means, said transformer means for coupling said sensed input voltage from said first winding to said second winding of said transformer means;
   (c) clock signal input means for coupling a clock signal to said improved analog sense circuit;
   (d) capacitor means coupled to the first terminal of said second winding of said transformer means; and
   (e) switching means coupled between said capacitor means and said second terminal of said second winding of said transformer means, said switching means responsive to said clock signal for causing said capacitor means to charge upon the occurrence of said clock signal; said sensing means comprising twin diodes having a common node and a resistor wherein said twin diodes are disposed in an opposed relation with respect to said common node, one terminal of said twin diodes being connected to one of said terminals of said first winding of said transformer means and the opposite terminal of said twin diodes comprising an input terminal of said sensing means, and further wherein said resistor is coupled between said common node of said twin diode and the other terminal of said first winding of said transformer means, wherein the connection of said resistor and said transformer winding comprises the other input terminal of said sensing means.

3. The apparatus of claim 2 wherein said twin diode is coupled in a common cathode configuration.

4. The apparatus of claim 2 wherein said twin diode is coupled in a common anode configuration.

5. An improved analog sense circuit comprising:
   (a) sensing means for passively sensing an input voltage;
   (b) transformer means having first and second windings wherein each of said first and second windings have first and second terminals and further wherein said first and second terminals of said first winding are coupled to said sensing means, said transformer means for coupling said sensed input voltage from said first winding to said second winding of said transformer means;
   (c) clock signal input means for coupling a clock signal to said improved analog sense circuit;
   (d) capacitor means coupled to the first terminal of said second winding of said transformer means; and
   (e) switching means coupled between said capacitor means and said second terminal of said second winding of said transformer means, said switching means responsive to said clock signal for causing said capacitor means to charge upon the occurrence of said clock signal; said sensing means including positive and negative power supply inputs, twin diode means having a common node and two electrodes, an amplifier having non-inverting and inverting inputs, first, second and third resistors and a capacitor wherein said fist resistor is coupled between said positive power supply input and one electrode of said twin diode means, said resistor and electrode connection further coupled to the inverting input of said amplifier means, said second resistor coupled between the output of said amplifier means and the common node of said twin diode means, said capacitor means coupled between the common node of said twin diode means and one of said terminals of said first winding of said transformer means, said third resistor coupled between the junction of said capacitor and said second resistor and said negative power supply input, the other electrode of said twin diode means connected to the other said terminal of said first winding of said transformer means, and said input voltage connected between the non-inverting input of said amplifier means and the junction of said capacitor and said one of said terminals of said first winding.

6. The apparatus of claim 1 wherein said transformer means is a 1:1 transformer.

7. The apparatus of claim 1 wherein said switching means includes a FET transistor.

8. An improved isolated sensor comprising:
   (a) first and second terminal means for inputting a voltage to be sensed;
   (b) twin diode means having a common terminal and first and second electrodes wherein said first electrode means is coupled to said first terminal means;
   (c) first resistor means coupled between said common terminal of said twin diode means and said second terminal means;
   (d) transformer means having primary and secondary windings wherein said primary winding is coupled between the second electrode of said twin diode means and said second terminal means;
   (e) third and fourth terminal means for outputting an isolated sensed voltage wherein said third terminal is coupled to the secondary winding of said transformer means;

(f) capacitor means coupled across said third and fourth terminal means;
(g) means for inputting a clock signal; and
(h) switching means responsive to said clock signal and coupled between one of said third and fourth terminal means and said secondary winding of said transformer means for causing said capacitor means to charge upon the occurrence of said clock signal.

9. An improved isolated sensor comprising:
(a) first and second terminal means for inputting a voltage to be sensed;
(b) twin diode means having a common cathode terminal and first and second anodes wherein said first anode means is coupled to said first terminal means;
(c) first resistor means coupled between said common cathode of said twin diode means and said second terminal means;
(d) transformer means having primary and secondary windings wherein said primary winding is coupled between the second anode of said twin diode means and said second terminal means;
(e) third and fourth terminal means for outputting an isolated sensed voltage wherein said third terminal is coupled to the secondary winding of said transformer means;
(f) capacitor means coupled across said third and fourth terminal means;
(g) means for inputting a clock signal; and
(h) switching means responsive to said clock signal and coupled between one of said third and fourth terminal means and said secondary winding of said transformer means for charging said capacitor on the occurrence of said clock signal.

10. The improved analog circuit of claim 9 wherein said switching means includes means coupled between said clock signal input means and said capacitor to provide a source of charging current upon the positive occurrence of said clock signal.

11. An improved analog sense circuit comprising:
(a) input means including first and second input terminals;
(b) amplifier means having an inverting and non-inverting input terminals and an output terminal wherein said non-inverting input is coupled to said first input terminal;
(c) first voltage source input means;
(d) a first resistor coupled between said first voltage source input means and the inverting input of said amplifier means;
(e) transformer means having first and second windings wherein each of said first and second windings has a first and second terminal and further wherein said second terminal of said first winding is coupled to said second input terminal;
(f) twin diode means coupled between said the inverting input of said amplifier means and said first terminal of said first winding of said transformer means wherein said twin diode includes a common cathode terminal;
(g) a first capacitor coupled between said common cathode terminal of said twin diode means and said second input terminal;
(h) a second voltage source input terminal;
(i) second resistor means coupled between the output of said amplifier means and said common cathode terminal of said twin diode means;
(j) third resistor means coupled between said common cathode terminal of said twin diode means and said second voltage source input terminal;
(k) output means including first and second output terminals wherein said first output terminal is coupled to the first terminal of said second winding of said transformer means;
(l) clock signal input means for coupling a clock signal to said improved analog sense circuit;
(m) a first capacitor coupled across said first and second output terminals;
(n) means coupled between said clock signal input means and said first capacitor to provide a source of charging current upon the positive occurrence of said clock signal; and
(o) switching means, responsive to said clock signal, coupled between the second terminal of said second winding of said transformer means and said second output terminal wherein said switching means effects the charging of said capacitor upon the occurrence of said clock signal.

12. The apparatus of claim 11 further including a second capacitor coupled between said means coupled between said clock signal input means and said first capacitor and said second output terminal.

13. An improved analog sense circuit comprising:
(a) input means including first and second input terminals;
(b) amplifier means having an inverting and non-inverting input terminals and an output terminal wherein said non-inverting input is coupled to said first input terminal;
(c) first voltage source input means;
(d) a first resistor coupled between said first voltage source input means and the inverting input of said amplifier means;
(e) transformer means having first and second windings wherein each of said first and second windings has a first and second terminal and further wherein said second terminal of said first winding is coupled to said second input terminal;
(f) twin diode means coupled between said the inverting input of said amplifier means and said first terminal of said first winding of said transformer means wherein said twin diode includes a common anode terminal;
(g) a first capacitor coupled between said common anode terminal of said twin diode means and said second input terminal;
(h) a second voltage source input terminal;
(i) second resistor means coupled between the output of said amplifier means and said common anode terminal of said twin diode means;
(j) third resistor means coupled between said common anode terminal of said twin diode means and said second voltage source input terminal;
(k) output means including first and second output terminals wherein said first output terminal is coupled to the first terminal of said second winding of said transformer means;
(l) clock signal input means for coupling a clock signal to said improved analog sense circuit;
(m) a first capacitor coupled across said first and second output terminals;
(n) means coupled between said clock signal input means and said first capacitor to provide a source of charging current upon the positive occurrence of said clock signal; and (o) switching means, responsive to said clock signal, coupled between the second terminal of said second winding of said transformer means and said second output terminal wherein said switching means effects the charging of said capacitor upon the positive occurrence of said clock signal.

14. The apparatus of claim 13 further including a second capacitor coupled between said means coupled between said clock signal input means and said first capacitor and said second output terminal.

* * * * *